United States Patent [19]

Sattlegger et al.

[11] 3,986,999
[45] Oct. 19, 1976

[54] STORABLE ORGANOSILOXANE COMPOSITIONS FOR PRODUCING FUNGI-RESISTANT RUBBERY MASSES

[75] Inventors: Hans Sattlegger, Odenthal-Gloebusch; Brigitte Hamburger, Cologne; Karl Schnurrbusch, Leverkusen-Steinbuechel; Horst Steinbach, Schildgen, all of Germany

[73] Assignee: Bayer Aktiengesellschaft, Leverkusen, Germany

[22] Filed: June 24, 1974

[21] Appl. No.: 482,124

[30] Foreign Application Priority Data

July 4, 1973 Germany............................ 2333966

[52] U.S. Cl............................. 260/30.2; 260/30.8 R; 260/31.2 R; 260/32.4; 260/33.8 SB; 260/45.7 S; 260/45.8 A; 260/45.8 R; 260/45.9 KA; 260/46.5 G; 424/78
[51] Int. Cl.² ........................ C08K 5/34; C08K 5/45
[58] Field of Search .................. 424/78; 260/45.7 S, 260/30.8 R, 30.2, 46.5 G, 31.2 R, 32.4, 33.8 SB, 45.8 R, 45.8 A, 45.9

[56] References Cited
UNITED STATES PATENTS

| | | | |
|---|---|---|---|
| 3,127,363 | 3/1964 | Nitzsche et al. | 260/46.5 G |
| 3,296,161 | 1/1967 | Kulpa | 260/46.5 G |
| 3,689,454 | 9/1972 | Smith et al. | 260/46.5 G |
| 3,794,736 | 2/1974 | Abbott et al. | 424/78 |

*Primary Examiner*—Melvyn I. Marquis
*Attorney, Agent, or Firm*—Burgess, Dinklage & Sprung

[57] ABSTRACT

In a storable plastic organopolysiloxane composition which can be converted into a rubbery-elastic mass under the action of water and prepared by mixing an α,ω-dihydroxypolydiorganosiloxane with a silicon-containing crosslinking agent, the improvement which comprises incorporating in said mixture about 1 to 20% by weight of at least one material selected from the group consisting of dioxane, acrylonitrile, acetonitrile, trichloroethylene, butanesultone, butyl acetate and carbon tetrachloride. There may be included up to about 70% by weight of α,ω-bis-(triorganosiloxy)-polydiorganosiloxane, up to about 5% by weight of at least one heavy metal salt or amine as a crosslinking accelerant, and about 10 to 70% by weight of at least one inert filler.

12 Claims, No Drawings

STORABLE ORGANOSILOXANE COMPOSITIONS FOR PRODUCING FUNGI-RESISTANT RUBBERY MASSES

The invention relates to plastically moldable mixtures of organopolysiloxanes with certain crosslinking agents, which, in the presence of water or water vapor, are converted into a rubbery-elastic state.

Such mixtures are principally used as jointing putties and mastics in the building trade, in sanitary equipment, and in constructing aquaria. They all contain, as the basic constituent, an $\alpha,\omega$-dihydroxypolydiorganosiloxane optionally mixed with filler or other additives, such as pigments. If this is mixed with a silicon compound which contains at least three groups which can react both with silanol groups and with water, and if at the same time access of moisture is prevented, reaction mixtures which are stable on storage are obtained, which on access of air from the atmosphere are converted into an elastomeric crosslinked product by the water vapor content in the air.

As water-reactive silicon compounds which have this crosslinking action, alkoxysilanes, aminosilanes, oximatosilanes, acyloxysilanes and acylamidosilanes, for example, are known and customary. The diversity of these crosslinking agents affords the welcome opportunity of suiting the crosslinking agent to the particular technical requirements, say with regard to processing, adhesion to a particular substrate, and mechanical properties.

Optionally, the speed and course of these reactions are additionally influenced by adding catalysts or other substances. Substances to improve the adhesion of the crosslinked organopolysiloxane elastomer to various substrates are also at times added to these compositions.

The abovementioned materials are now mixed in various apparatuses to give a paste, containing a polymer, fillers and additives, which is stable on storage in the absence of moisture and is only converted to an elastomer when there is access of moisture.

It is a feature shared by all these rubbery-elastic products that they are frequently attacked by fungi and other microbacteria, above all when used for sanitary applications. Such unpleasant concomitant phenomena manifest themselves, for example, as fungal attack of rubber seals on baths, showers, toilets and washbasins. These seals initially assume a spotty brown discoloration and subsequently turn completely black. Depending on the frequency and thoroughness of cleaning, this effect, which makes the white materials unattractive and unhygienic, manifests itself sooner or later.

Attempts have been made for a long time to eliminate this phenomenon by mixing further additives of known fungicidal action into the paste. However, these substances are mostly rather complicated compounds which must not undergo change in the abovementioned mixture on storage and under transport conditions, sometimes at up to 50° C, and which — and this is even more difficult — must not have an adverse influence on the crosslinking mechanism and on the properties (color, adhesion or degree of crosslinking) of the paste and of the crosslinked product. Amongst current fungicides it has not been possible to find any which can be employed, without interfering, with all the crosslinking agents used for the systems mentioned here, and which does not entail some disadvantages.

It is accordingly an object of the invention to provide substances, which can be employed in all the abovementioned crosslinking systems, which do not interfere with the crosslinking mechanism even on prolonged storage of the non-crosslinked stage, which do not influence the color, adhesion and mechanical properties of the crosslinked product, which still show a very good fungicidal action even after a rotting test in soil for one year and which can be mixed into the paste in conjunction with crosslinking agents or with the organopolysiloxanes.

These and other objects and advantages are realized in accordance with the present invention by incorporating about 1 to 20% by weight of at least one material selected from the group consisting of dioxane, acrylonitrile, acetonitrile, trichloroethylene, butanesultone, butyl acetate and carbon tetrachloride, into the conventional mixture of an $\alpha,\omega$-dihydroxypolydiorganosiloxane with a silicon-containing cross-linking agent to produce a storable plastic organopolysiloxane composition which can be converted into a fungi-resistant rubbery-elastic mass under the action of water. There may also be included up to about 70% by weight of $\alpha,\omega$-bis-(triorganosiloxy)-polydiorganosiloxane, up to about 5% by weight of at least one heavy metal salt or amine as a crosslinking accelerant, and about 10 to 70% by weight of at least one inert filler.

The added solvents have the great advantage that they lower the melting point of methyltriacetoxysilane, which is very frequently employed as a crosslinking substance, to the point that warming the crosslinking agent is no longer necessary when preparing the paste and also, on cool storage of the polymer-filler-crosslinking agent mixture, crystallization phenomena are no longer observed.

In a typical recipe, for example, 4% of the crosslinking agent methyltriacetoxysilane are employed. At a 4% content of solvent in the composition, a crosslinking agent/solvent mixture in the ratio of 1:1 is thus employed, and this has melting points of +17° C in the case of carbon tetrachloride, +14° C in the case of trichloroethylene, −16° C in the case of acrylonitrile, +11° C in the case of butyl acetate, −20° C in the case of acetonitrile and +11.7° C in the case of butanesultone, as against a value of +42° C for the pure silane.

The fungal growth-preventing action of an elastomer, obtained with a solvent/crosslinking agent mixture according to the invention under the action of moisture, is excellent in a soil rotting test described in more detail below. If in addition an activity against particular fungi is to be achieved or the spectrum of fungicidal action is to be made broader, it is possible, without difficulty, to add one of the customary fungicides, in a suitable concentration for the particular requirements, to this crosslinking agent mixture. At the same time it is found, surprisingly, that the action of the fungicide is boosted by the combination to such an extent that it is now even possible to employ fungicides which, when incorporated by themselves into the mixture, lead to interference with the crosslinking reaction, interference with adhesion and color changes. The reason is probably that now very much less fungicide has to be employed to achieve a broad action. While the exclusive use of, for example, cetyldimethylbenzylammonium chloride or dimethyldioctadecylammonium chloride in a recipe requires ½ to 1% in order to produce an effect in the soil rotting test, orders of magnitude of 1/10% suffice for the additional achievement of a certain resistance towards particular fungal cultures. While the large amount, without dioxane, leads to distinct interference with adhesion and with the crosslinking behavior the small amount used in conjuction with dioxane does not show any undesired concomitant phenomena.

In addition, some of the compounds listed, such as dioxane, acetonitrile and acrylonitrile, have a further advantage, namely their miscibility with water. At times, a mastic is intended to crosslink to an elastomer very rapidly after it has been injected; this is the case, for example, in constructing swimming pools. In the present case, it is possible, for example, to mix dioxane with water and to incorporate this as a second component, unusually easily and homogeneously, into one of the pastes described above (a mixture of organopolysiloxane, crosslinking agent, filler and auxiliaries).

It is also possible, for example, to mix organopolysiloxane with pyrogenic silica, chalk, pigments and water (the inert filler accounting for, for example, 10–15%) and to add to this mixture, when required, a mixture of methyltriacetoxysilane and dioxane in the ratio of 1:1 (together with catalysts). A ready-mixed one-component system, such as is mentioned in the examples, also lends itself unexpectedly well to mixing with 10% of a mixture of 1 part of $H_2O$ and 9 parts of dioxane and this gives a rapidly reacting two-component system containing fungicide.

The process according to the invention is intended to be explained in more detail with the aid of the examples which follow wherein parts denote parts by weight, unless stated otherwise.

EXAMPLE 1

To a mixture of 60 g of $\alpha,\omega$-dihydroxypolydimethylsiloxane of viscosity 50,000 cP and 25 g of $\alpha,\omega$-bis-(trimethylsiloxy)polydimethylsiloxane of viscosity 1,300 cP 8 g of a 50% strength solution of methyltriacetoxysilane in dioxane are added at room temperature and the whole is stirred briefly. At this point, an adhesion promoter can optionally also be added (for example 1 g of di-tert.-butoxydiacetoxysilane). 1.5 g of titanium dioxide and 9.5 g of a finely dispersed silica are now added. The mixture is stirred in a planetary stirrer until it is homogeneous, which is the case after about 20 minutes. Finally, small amounts of a catalyst, in the present case, for example, 5 mg of dibutyltin diacetate, are added either direct or dissolved in a solvent (for example toluene or further dioxane), and are homogeneously stirred in for 10 minutes in vacuo. The application of a vacuum is advisable in order to make it possible to fill the composition, after the mixing process, homogeneously into a storage container (tube or cartridge).

After filling the paste into tubes while excluding air, the paste was stored for 6 weeks at 50° C in order to test the storage stability and was then spread at a thickness of about 2 mm and cured by means of atmospheric humidity (65% relative atmospheric humidity) in about one day to give a rubber sheet. Other tubes were stored at +4° C and −20° C and after 24 hours showed no crystal seeds whatsoever, in contrast to pastes not containing dioxane. In contrast to the other fungicides, the sheet was snow-white and showed no discoloration, in spite of having stored the paste at 50° C (which corresponds to a storage stability of about ½ year under fluctuating room temperatures, as required in practice).

Such a rubbery film had approximately the following mechanical properties (both before and after storage): 100% modulus about 4 kp/cm$^2$, tensile strength about 18 kp/cm$^2$, elongation at break about 450%, Shore A hardness about 24).

This rubber film was subjected to a so-called soil rotting test (garden compost soil adjusted to pH 7 with sand and lime, at 22° C and 85–90% relative atmospheric humidity, using mold fungus cultures and mold salt solution).

The assessment was made quarterly, and after a storage time of 1 year an excellent anti-fungal action could still be observed as compared to rubber sheets not provided with a fungicide.

EXAMPLE 2

To a mixture of 58 g of $\alpha,\omega$-dihydroxypolydimethylsiloxane of viscosity 50,000 cP and 20 g of $\alpha,\omega$-bis-(trimethylsiloxy)polydimethylsiloxane of viscosity 1,300 cP 11.4 g of a 50% strength solution of methyltributanone-oxime-silane in dioxane was added at room temperature and the whole was stirred briefly. 3.0 g of a white paste of titanium dioxide and $\alpha,\omega$-bis-(trimethylsiloxy)-polydimethylsiloxane in the ratio of 1:1 and 12 g of a finely dispersed silica were added. The mixture was stirred until it was homogeneous (about 20 minutes). 1 g of dibutyl-tin dilaurate was then added and the composition was once again stirred for 10 minutes, in vacuo, and was then packaged. After packaging the paste, the latter was stored for 6 weeks at 50° C to test the storage stability and was then spread at a thickness of about 2 mm and crosslinked by means of atmospheric humidity in about 1 day to give a sheet. Such a rubber film had approximately the following mechanical properties:

| | |
|---|---|
| 100% modulus: | 6 kp/cm$^2$ |
| Tensile strength: | 18 kp/cm$^2$ |
| Elongation at break: | 400% |
| Shore A hardness: | 40 |

This film was subjected to the soil rotting test described, and assessed at half-yearly intervals, a very good fungicidal action being observed compared to pastes without fungicide.

EXAMPLE 3

To a mixture of 60 g of $\alpha,\omega$-dihydroxypolydimethylsiloxane of viscosity 18,000 cP and 20 g of $\alpha,\omega$-bis-(trimethylsiloxy)polydimethylsiloxane of viscosity 1,300 cP 4.6 g of a titanium compound (diacetoacetic ester diisobutyl titanate) were added at room temperature and the whole was stirred briefly. 7 g of highly dispersed silica, 8 g of chalk and 1 g of a color paste of $\alpha,\omega$-bis-(trimethylsiloxy)polydimethylsiloxane, carbon black and titanium dioxide were added thereto and stirred in homogeneously. 1 g of dibutyltin dilaurate was added thereto and again stirred in homogeneously. Thereafter, 7.5 g of a mixture of 2 parts of di-(N-methylbenzamido)-methylethoxysilane and 1 part of dioxane were added to the mixture. After thorough stirring in vacuo and packaging the paste, the latter was again subjected to a 6 weeks' storage at 50° C, spread, exposed to the air in order to crosslink, and subjected to the soil rotting test. A film had approximately the following mechanical properties:

| | |
|---|---|
| 100% modulus: | 2 kp/cm² |
| Tensile strength: | 8 kp/cm² |
| Elongation at break: | 550% |
| Shore A hardness: | 16 |

Here again, a very good anti-fungal action was found.

EXAMPLES 4 AND 5

A mixture corresponding to Example 1 was prepared, substituting butanesultone for dioxane in one case, while in the other 1% of dimethyldioctadecylammonium chloride was added to the mixture of methyltriacetoxysilane and butanesultone: dimethyldioctadecylammonium chloride is a commercially available fungicide which, when employed by itself, displays a fungicidal action only at an about 10% concentration at which it interferes with the cross-linking and adhesion of the elastomer. In both cases, good stability of the mixture on storage, no signs of crystallization of methyltriacetoxysilane and an outstanding fungicidal action were found.

EXAMPLE 6

Here, a combination of two different substances was employed, again in accordance with Example 1, 8 parts of a mixture of 1 part of acetonitrile, 1 part of butanesultone and 2 parts of methyltriacetoxysilane. The mixture, the paste prepared therefrom and the crosslinking product showed, similarly to Examples 4 and 5, a pattern of mechanical properties as described in Example 1, together with outstanding stability on storage and a fungicidal action.

Thus, in Examples 1, 2, 4, 5 and 6, 1 part by weight of solvent is added per part by weight of cross-linked agent while, in Example 3, 0.5 part by weight of solvent is added per part by weight of cross-linking agent.

In the practice of the invention the organo groups of the $\alpha,\omega$-dihydroxypolydiorganosiloxane may comprise one or more alkyl, alkenyl or aryl radicals, e.g. methyl, ethyl, propyl, butyl, chloromethyl, vinyl, phenyl, methylphenyl, chlorophenyl, and the like, especially methyl. The silicon-containing crosslinking agent may be any tri- or tetra-functional silane with the fourth silicon bond, when a carbon-silicon link, taken up by alkyl or aryl radicals as indicated above. Representative cross-linking agents are shown in the foregoing examples and may be present in up to about 15% by weight of the composition, preferably about 2.5 to 8% by weight.

Non-polymerizable siloxanes can also be present in the composition in up to about 70% by weight, e.g. $\alpha,\omega$-bis-(triorganosiloxy)-polydiorganosiloxanes wherein the organo groups are as defined hereinabove, such as $\alpha,\omega$-bis-(trimethylsiloxy)-polydimethylsiloxane.

Heavy metal salts and amines as cross-linking accelerants, known in the art and illustrated in the examples, may also be added in up to about 5% by weight.

It will be appreciated that the instant specification and examples are set forth by way of illustration and not limitation, and that various modifications and changes may be made without departing from the spirit and scope of the present invention.

What is claimed is:

1. In a storable plastic organopolysiloxane composition which can be converted into a rubbery-elastic mass under the action of water and prepared by mixing an $\alpha,\omega$-dihydroxypolydiorganosiloxane with a silicon-containing cross-linking agent, the improvement which comprises incorporating in said mixture 1 to 20% by weight of at least one member selected from the group consisting of dioxane, acrylonitrile, acetonitrile, trichloroethylene, butanesultone, butyl acetate and carbon tetrachloride, said member being present in 0.5 to 1 part per part by weight of said cross-linking agent.

2. A composition according to claim 1, containing 33 up to 42% by weight of $\alpha,\omega$-bis-(triorganosiloxy)-polydiorganosiloxane based on the weight of $\alpha,\omega$-dihydropolydiorganosiloxane, an effective amount up to 5% by weight of at least one heavy metal salt or amine as a cross-linking accelerant, and about 10 to 70% by weight of at least one inert filler.

3. A composition according to claim 1, including a fungicide in an amount which is effectual but which would be ineffectual in the absence of said incorporated member.

4. A composition according to claim 1, wherein said incorporated member is dioxane.

5. A composition according to claim 1, wherein said incorporated member is acrylonitrile.

6. A composition according to claim 1, wherein said incorporated member is acetonitrile.

7. A composition according to claim 1, wherein said incorporated member is trichloroethylene.

8. A composition according to claim 1, wherein said incorporated member is butanesultone.

9. A composition according to claim 1, wherein said incorporated member is butyl acetate.

10. A composition according to claim 1, wherein said incorporated member is carbon tetrachloride.

11. In the preparation of a rubbery-elastic mass by mixing an $\alpha,\omega$-dihydropolydiorganosiloxane with a silicon-containing cross-linking agent, and exposing said mixture to water, the improvement which comprises incorporating in said mixture 1 to 20% by weight of at least one member selected from the group consisting of dioxane, acrylonitrile, acetonitrile, trichloroethylene, butanesultone, butyl acetate and carbon tetrachloride, and exposing said mixture to water while still containing said member, whereby the rubbery-elastic mass resists attack by fungi.

12. A composition according to claim 1, wherein said cross-linking agent is methyltriacetoxysilane and said member is present in about 4% by weight.

* * * * *